United States Patent [19]

Brax

[11] 4,428,686
[45] Jan. 31, 1984

[54] THERMOCOUPLE PYROMETRIC APPARATUS

[75] Inventor: Jean A. Brax, Chalon sur Saone, France

[73] Assignee: Saint-Gobain Emballage, France

[21] Appl. No.: 309,257

[22] Filed: Oct. 7, 1981

[30] Foreign Application Priority Data

Oct. 14, 1980 [FR] France .................. 80 21903

[51] Int. Cl.³ .................. G01K 7/02; H01L 35/02
[52] U.S. Cl. .................. 374/179; 65/29; 136/230; 136/233; 136/234; 136/236 R; 136/242; 374/139
[58] Field of Search ............... 136/230, 232, 234, 236, 136/242; 65/29; 374/139, 179

[56] References Cited

U.S. PATENT DOCUMENTS

| 3,329,534 | 7/1967 | Adler et al. | 136/233 |
| 3,537,911 | 11/1970 | Hynd | 136/242 |
| 4,243,402 | 1/1981 | Sensi | 136/242 X |

FOREIGN PATENT DOCUMENTS

| 2844417 | 3/1980 | Fed. Rep. of Germany | 136/242 |
| 147817 | 11/1962 | U.S.S.R. | 136/242 |
| 215559 | 11/1968 | U.S.S.R. | 136/242 |

OTHER PUBLICATIONS

Catalogue No. 14, Pyrometers, The Brown Instrument Co., Philadelphia, PA, 1924, p. 49.

Primary Examiner—Leland A. Sebastian
Attorney, Agent, or Firm—Pennie & Edmonds

[57] ABSTRACT

The invention relates to a pyrometric rod for measuring the temperatures of molten glass.

The rod according to the invention comprises a rod containing at least a thermocouple, this rod being provided with a short tip of metal or metal alloy, the tip being surmounted by a brace of refractory material.

The pyrometric rod is applied to measuring temperatures of molten glass in a glass bath or in a channel.

9 Claims, 3 Drawing Figures

THERMOCOUPLE PYROMETRIC APPARATUS

The invention relates to a thermocouple pyrometric rod intended to measure temperatures in a glass bath.

In making glass articles it is important constantly to know the temperature prevailing at various points of the molten glass and particularly in the channel between the glass working furnace outlet and the article shaping station.

Known pyrometric rods generally consist of a body of refractory material containing a thermocouple, the body being protected, over its entire length, from the corrosive environment consisting of the molten glass and atmosphere lying over the earth, by a long sheath of ceramic or refractory metal, in practice of platinum or platinum alloy. Generally, this sheath is fastened in a relatively cold zone which makes it necessary to give it a length on the order of 60 cm to 1 m and it therefore is very expensive.

The invention proposes a pyrometric rod exhibiting resistance to corrosion almost unlimited in time, while being particularly economical.

The pyrometric rod according to the invention comprises a body or rod of refractory material containing at least a thermocouple, this body being provided with a short protective tip consisting of a metal or metal alloy chemically and mechanically resistant to the action of the glass brought to a high temperature and the atmosphere lying over the bath, the tip being supported by a brace of refractory material thermally insulating it from the other metal parts belonging to the pyrometric rod.

Under one aspect of the invention, the short tip of platinum or platinum alloy is surmounted by a brace of refractory material such as a sillimanite tube, this brace being thrust by an elastic recall means, such as a spring, to be applied on the bottom of a well descending in the immediate vicinity of the glass, of refractory material, such as sillimanite, belonging to the pyrometric rod or an intermediate piece acting as a rod.

The rod according to the invention forms a rigid unit easy to assemble and disassemble as a unit because it does not have particular fastening means such as pins or locking clamps.

According to an advantageous characteristic of the invention, the pyrometric rod comprises several thermocouples associated so that their hot junctions are located at different levels; thus, this makes it possible simultaneously to obtain several temperature samples staggered over the entire height of the bath.

Other advantages and characteristics of the invention will come out from the following description, illustrated by the attached figures.

Figure 1:
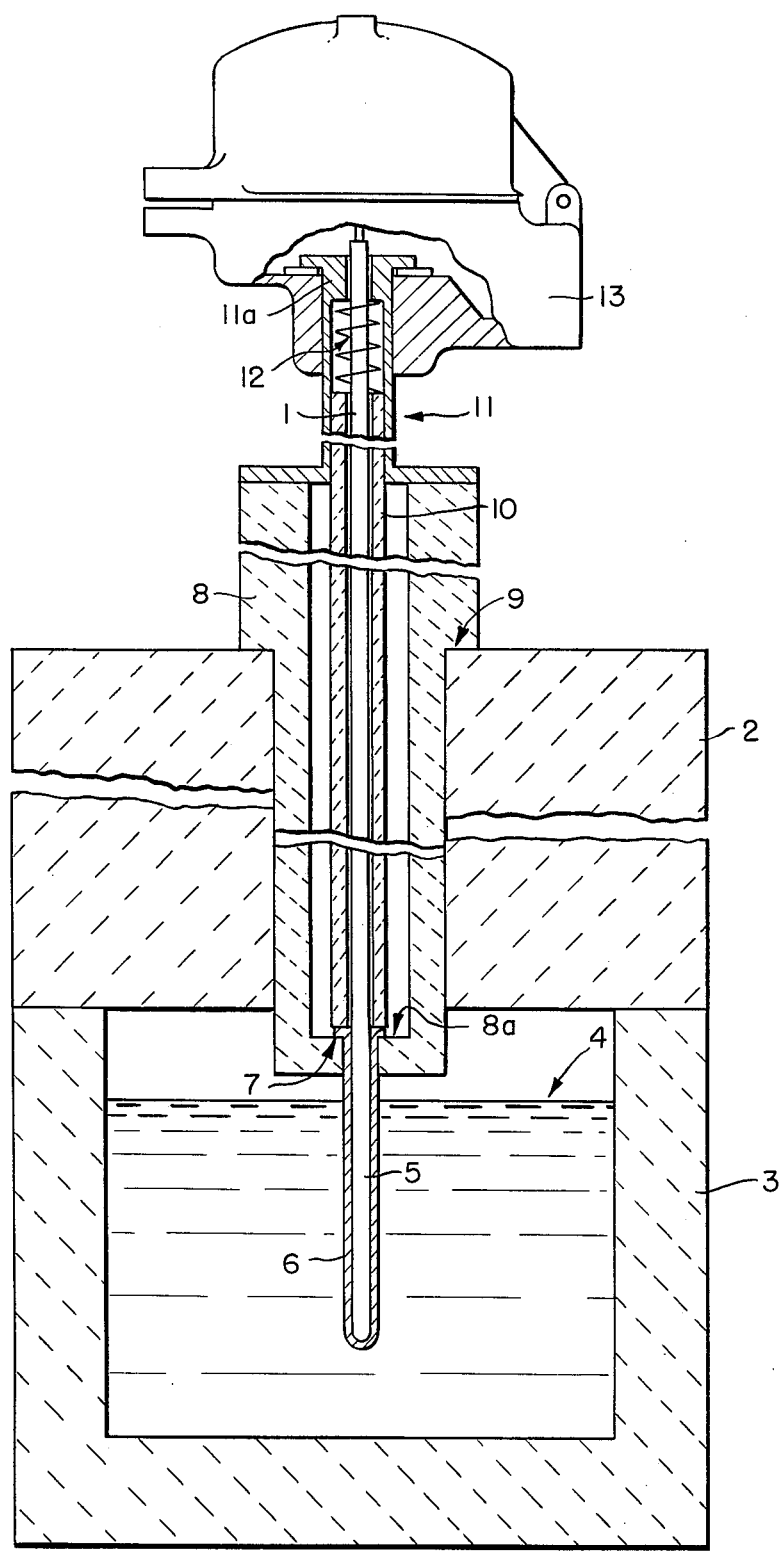
FIG. 1 is a section in elevation of a pyrometric rod according to the invention, in measuring position above a channel of molten glass.

FIG. 1 shows pyrometric rod 1 going through a dome 2 of refractory material of a channel delimited by a refractory unit 3 in which the molten glass flows and whose level is shown as 4.

The pyrometric rod is formed by a rod such as a blind tube 5 of refractory material, such as alumina, containing one or more thermocouples as described below. The lower end of the rod is protected by a tip 6 of platinum alloyed with 10% rhodium, chemically and mechanically resistant to the action of the molten glass and atmosphere lying above the bath. Rod 5 is inserted by gentle friction in tip 6. This tip is short (the length being a function of the height of the glass, generally some twenty centimeters long for a rod measuring the temperatures in a channel at the output of the glass working furnace) in the shape of a glove finger, has a clamp 7 which acts as a positioning stop.

Rod 5 and its tip 6 go through an orifice made in the base of a ground tubular refractory support 8, belonging to the rod. This support 8, housed in an opening made in dome 2, rests on the upper face of this dome by a shoulder 9. It forms a well whose bottom 8a is very close, on the order of some centimeters, to the glass surface.

Rod 5 and tip 6 are held in place by a refractory brace tube 10 whose upper part is inserted in a riser 11 consisting of a metal tube, of stainless steel for example, and locked by a spring 12 to be supported on its cover 11a. Under the action of this spring, the lower end of the brace tube comes to be flat on clamp 7 of tip 6 on the ground bottom of the well of support 8.

The upper part of the rod consists of a measuring head 13. Thus, a rigid unit is obtained, assembled by simple fitting without other fastening means such as pins or holding clamps, and easy to assemble and disassemble.

Figure 2:
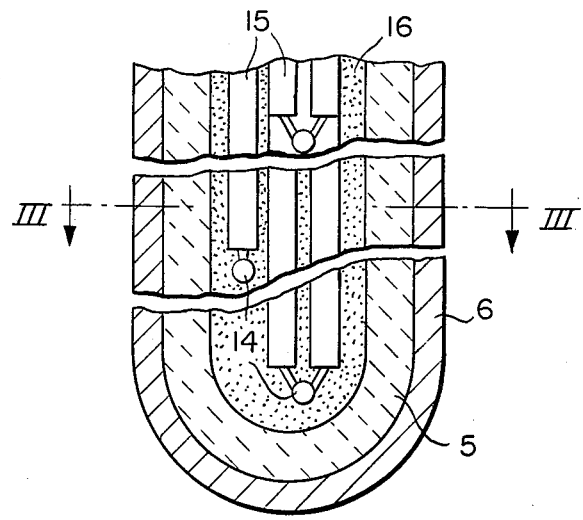
FIG. 2 is a longitudinal section of the end of the pyrometric rod.
Figure 3:
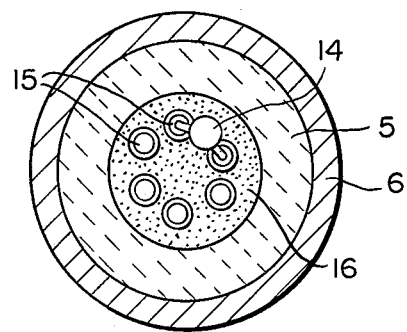
FIG. 3 is a radial section along III—III of FIG. 2.

FIGS. 2 and 3 show the arrangement of the constitutive elements of the pyrometric rod and particularly placement of the thermocouples. The various hot junctions 14 come out at the lower part of the refractory capillary sheaths 15, insulating the wires of the thermocouples. These capillary sheaths 15, generally of alumina, are joined to one another so that hot junctions 14 are spaced along the longitudinal axis of the pyrometric rod and their spacing stays constant.

It is possible, for example, to join them in a shape by burying them in a mixture of sodium silicate and silica powder which performs the role of cement 16.

The group of thermocouples, thus assembled, is then introduced in rod 5. The rod is then slipped into metal tip 6 and placed in support 8 so it can be placed in the furnace or channel.

An example of pyrometric rod according to the invention comprises three thermocouples of platinum alloyed with 30% and 6% rhodium, whose wires are insulated by alumina capillary supplied by the DEGUSSA company.

In measuring position, the three hot junctions are placed respectively just below the free surface of the glass bath in the middle of the glass current and close to the sole.

The metal tip has a thickness on the order of a millimeter, while the refractory rod has a thickness on the order of 2 millimeters.

This structure achieves a sufficient rigidity to avoid deformation that can be caused by a rapid flow of the glass.

I claim:

1. Pyrometric apparatus for measuring the temperature of a molten material within a refractory unit, said apparatus comprising a tip formed of a material selected from the group consisting of platinum and an alloy of platinum both chemically and mechanically resistant to action of the molten material and the atmosphere above the molten material within a channel of said unit, said tip being closed at one end and having an opening at the other end, a rod received in said tip substantially to the depth of said closed end, a temperature indicating means supported at the other end of said rod, at least one thermocouple means disposed in said rod at a position to respond to the temperature of the molten material within said channel, each said thermocouple means connected to said temperature indicating means, means for supporting said tip on said unit so that said apparatus extends into said channel and the molten material within said channel, and a brace, said brace comprising a tubular body surrounding said rod and mounted by said support means to extend between said tip and other metal parts of said apparatus thereby to both mechanically and thermally insulate said tip and metal parts.

2. The apparatus of claim 1 wherein said alloy is a 10% rhodium-platinum alloy.

3. The apparatus of claim 1 wherein said brace is formed of a refractory material selected from the group consisting of sillimanite and alumina.

4. The apparatus of claim 3 wherein said brace is formed of sillimanite.

5. The apparatus of claim 1 wherein said support means includes clamp at the open end of said tip, said clamp mounted by said unit, said brace supported on said clamp, and a spring, said spring mounted to act between said temperature indicating means and brace and urge said brace and clamp against said unit.

6. The apparatus of claim 1 including a plurality of thermocouple means, each thermocouple means disposed within said rod at different locations to respond to the temperature of said molten material at different depths within said channel.

7. The apparatus of claim 1 or 6 including a sheath for each thermocouple means, and a refractory cement within said rod, said cement maintaining the disposition longitudinally of each thermocouple means with respect to each other thermocouple means.

8. The apparatus of claim 1 wherein said molten material is molten glass.

9. The apparatus of claim 1 wherein said rod has an outer surface pattern like the inner surface pattern of said tip, and of a dimension slightly smaller than that of said tip.

* * * * *